Jan. 25, 1955
E. B. LOWE
2,700,269
FRUIT CATCHING APPARATUS
Filed May 26, 1953
2 Sheets-Sheet 1
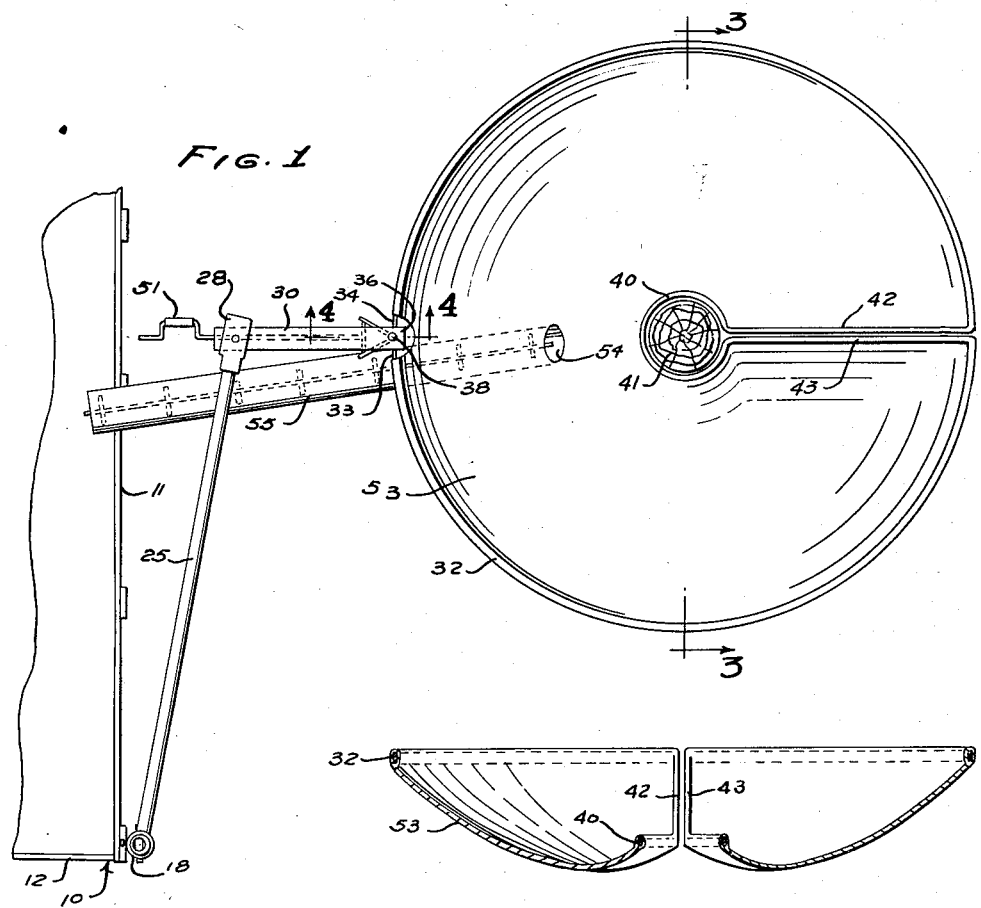
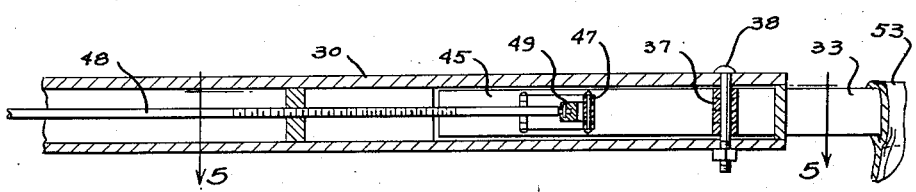
INVENTOR.
EDISON B. LOWE
BY
McMorrow, Berman & Davidson
ATTORNEYS Jan. 25, 1955  E. B. LOWE  2,700,269
FRUIT CATCHING APPARATUS
Filed May 26, 1953  2 Sheets-Sheet 2
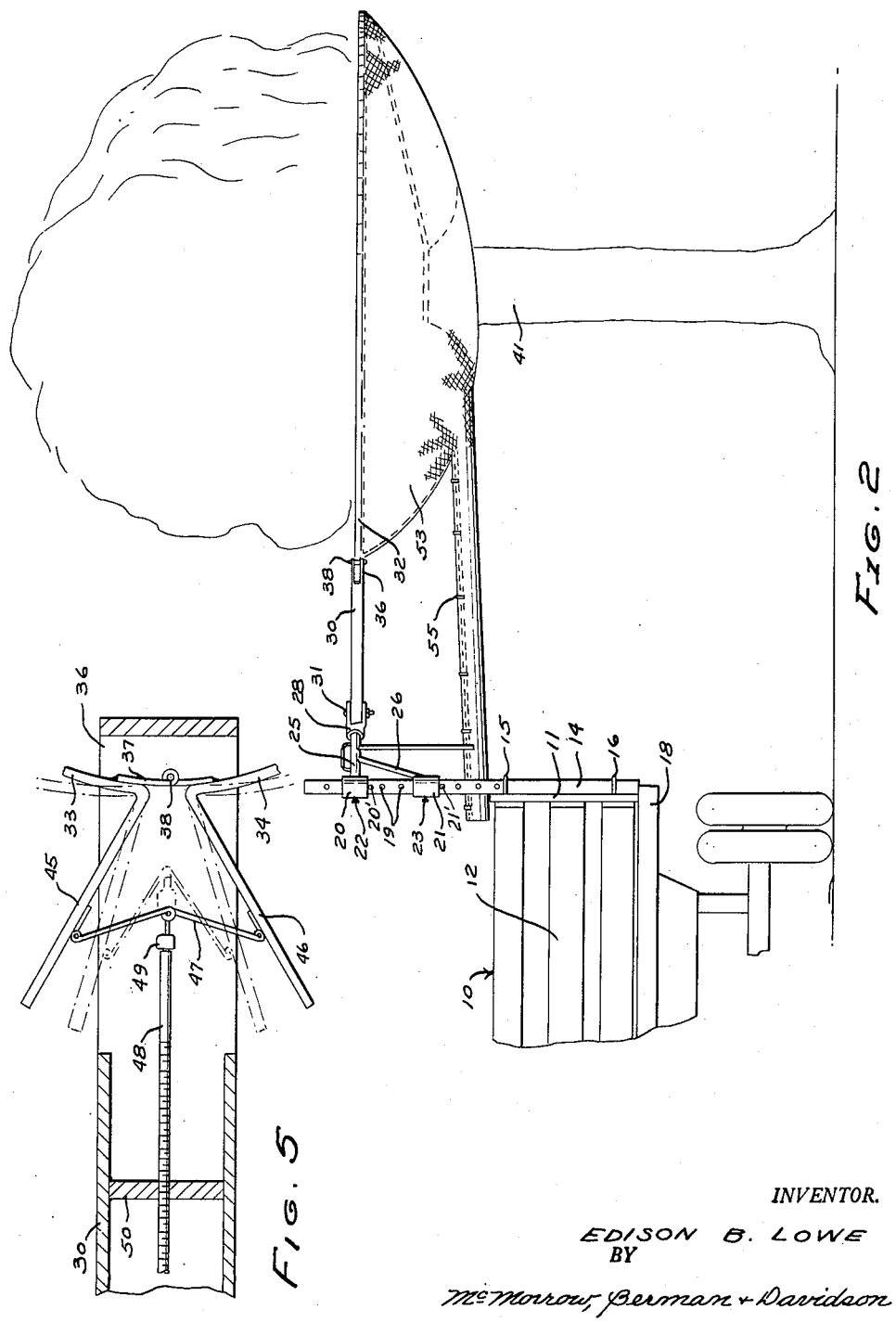
INVENTOR.
EDISON B. LOWE
BY
McMorrow, Berman & Davidson
ATTORNEYS United States Patent Office 2,700,269
Patented Jan. 25, 1955

2,700,269

FRUIT CATCHING APPARATUS

Edison B. Lowe, Arlington, Va.

Application May 26, 1953, Serial No. 357,459

6 Claims. (Cl. 56—329)

This invention relates to fruit catching apparatus to receive fruit or nuts dislodged from a fruit or nut tree by shaking or vibrating the tree, and more particularly to fruit catching apparatus adapted to be mounted on a vehicle bed or box and to convey the fruit received thereby directly into the associated vehicle bed.

It is among the objects of the invention to provide fruit catching apparatus which can be easily and conveniently mounted on a vehicle bed or box and moved to selected positions of adjustment relative to the supporting vehicle bed to facilitate application of the apparatus to a tree from which fruit or nuts are to be received; which has a fruit catcher which is divided to receive a tree therein and which can be manually closed around an associated tree; which has its fruit catcher formed of pliable material to receive fruit without bruising the fruit and with a discharge duct leading from the catcher into the associated vehicle bed or box, so that fruit falling into the catcher will be immediately discharged therefrom and will not accumulate in the catcher; and which is simple and durable in construction, economical to manufacture, easy to use, and effective and efficient in use.

Other objects and advantages will become apparent from a consideration of the following description and the appended claims in conjunction with the accompanying drawings wherein:

Figure 1 is a top plan view of fruit catching apparatus illustrative of the invention;

Figure 2 is side elevational view of the fruit catching apparatus illustrated in Figure 1;

Figure 3 is a transverse cross sectional view on the line 3—3 of Figure 1;

Figure 4 is a fragmentary cross sectional view on an enlarged scale on the line 4—4 of Figure 1; and Figure 5 is a fragmentary cross sectional view on a still further enlarged scale on the line 5—5 of Figure 4.

With continued reference to the drawings, the numeral 10 generally designates a vehicle bed or box having a side structure 11 and an end structure 12.

The fruit catching apparatus comprises a tubular post 14 disposed against the side structure of the vehicle bed 10 and secured to the side structure 11 in substantially vertical position by suitable means, such as the U bolts 15 and 16 extending around the post as locations spaced apart along the lower portion of the post and through suitable apertures provided in the side structure 11 of the vehicle bed 10. At its bottom end the post rests upon the outwardly projecting edge portion of the vehicle floor structure 18 and extends at its upper end above the top edge of the vehicle bed. The upper portion of the post is provided with apertures 19 arranged in diametrically opposed pairs with the pairs uniformly spaced apart longitudinally of the post, and collars or sleeves 20 and 21 are mounted on the post at locations spaced apart longitudinally of the upper portion of the post. These collars 20 and 21 may be supported for rotation on the post by pins 20' and 21', respectively, extending through selected apertures 19 at the bottom ends of the collars, and may be secured to the post against rotation relative thereto by suitable means, such as the set screws 22 and 23 extending through tapped holes in the collars 20 and 21 respectively, and engaging the post 14 at their inner ends.

An elongated link 25 is rigidly secured at one end to the upper collar 20 and a diagonal brace 26 is secured at one end to the lower collar 23 and at its other end to the link 25 at a location spaced from the collar 20, to support the link 25 substantially perpendicular to the post 14.

At its end remote from the post 14 the link 25 is provided with a yoke 28 and a tubular arm 30 has one end received in the yoke 28 and pivotally secured to the yoke by a pivot bolt 31 for swinging movement of the arm relative to the link 25 about the axis of the pivot bolt. The link 25 is swingable about the post 14 as well as adjustably movable longitudinally of the post, and the pivotal axis of the bolt 31 is substantially parallel to the longitudinal center line of the post 14.

A circular hoop 32 provided in two separate main portions of substantially semicircular shape and disposed in end to end relationship, has one pair of its adjoining ends disposed in a yoke formation 36 at the end of the arm 30 remote from the yoke 28 on the link 25, the two parts 33 and 34 of the hoop being connected together at this location by a hinge 37 having a hinge pin 38 extending through mutually registering apertures in the yoke formation 36 to pivotally mount the hoop on the arm 30 substantially in a plane including or parallel to the longitudinal center line of the link 25 and the arm 30.

A split ring 40 is centered within the hoop 32 and has a diameter sufficient to surround fruit or nut tree trunks, as indicated at 41, and spokes 42 and 43 connect the ends of the hoop parts 33 and 34 remote from the ends connected to the hinge 37 to the corresponding ends of the split ring 40.

The end portions of the hoop parts 33 and 34 connected to the hinge 37 are extended outwardly from the hoop and divergently from the hinge, as indicated at 45 and 46, and a second hinge or toggle 47 is connected between the levers 45 and 46 constituted by the terminal extension of the hoop parts 33 and 34. A screw shaft 48 is connected at one end to the center of the hinge 47 by a swivel connection 49 and is threaded through a tapped hole in a partition member 50 mounted in the tubular arm 30 intermediate the length of this arm. The screw shaft extends outwardly of the end of the arm 30 remote from the yoke formation 36 and is there provided with a hand crank 51 for rotating the screw shaft to thereby swing the parts 33 and 34 of the hoop relative to each other about the axis of the hinge pin 38.

A cover 53 of pliable material, such as light canvas or duck material, is disposed within the hoop 32 and secured to the hoop and the ring 40, completely closing or covering the space between the hoop and the ring. This cover is provided with marginal and internal hems respectively receiving the hoop 32 and the ring 40 and with radially disposed hems respectively receiving the spokes 42 and 43 and has an area somewhat greater than the area of the interior of the hoop, so that the cover sags downwardly to a limited extent around the ring 40 to provide an annular trough formation into which the fruit falls.

The cover 53 is provided with an opening 54 and a tubular duct 55 is connected at one end to the outer side of the cover 53 with its one end in registry with the opening 54 and this duct is adapted to extend at its other end through the side structure 11 of the vehicle bed at a location below the fruit catcher cover 53 to convey fruit from the interior of the catcher into the vehicle bed, so that the fruit will not accumulate in the catcher to cause bruising or damage to the fruit. As the catcher cover is of pliable, textile material having no rigid support, except the hoop, the ring and the two spokes 42 and 43, there is no material danger of the fruit being bruised as it falls into the catcher.

By threading the screw shaft 48 in a direction toward the hinge 37, as viewed in Figure 5, the levers 45 and 46 are moved toward each other and the side elements of the hoop moved away from each other about the axis of the hinge pin 38, thereby separating the spokes 42 and 43, so that a tree trunk can pass between these spokes from the exterior of the hoop 32 into the center ring 40 of the catcher. After the tree trunk is disposed in the ring, the screw shaft 48 is rotated in a direction to move it longitudinally away from the hinge 37, thereby forcing the levers 45 and 46 apart and moving the side members 33 and 34 of the hoop and the spokes 42 and 43 together to close the opening between the spokes with the tree trunk disposed in the ring 40.

With this arrangement, the fruit catcher is supported from the vehicle bed for quick and easy transportation from place to place and can be quickly disposed around a fruit or nut tree from which the fruit or nuts are to be harvested. After the catcher is placed in position around the tree, the tree is vibrated or shaken by suitable means, so that the fruit or nuts are dislodged from the tree and fall into catcher from which they pass through the discharge duct 55 into the vehicle bed 10 where they may be placed in suitable receptacles for further handling.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A fruit-catching apparatus comprising: a pair of hoop parts respectively formed with opposed semi-circular main portions; means hingedly connecting said main portions at one end thereof for swinging of the main portions toward one another to define a circular hoop, said hoop parts respectively having end portions rigid with and extending outwardly from said ends of the main portions at opposite sides of the hinge means; a center ring concentric with and surrounded by the hoop, the center ring being split to define ends thereon; spokes extending between the ends of the center ring and the other ends of the main portions; a pliable cover extending between and connected to said main portions and ring; an arm supporting said hoop parts and hinge means; and means on the arm connected to said end portions in spaced relation to the axis of the hinge means for, under the control of an operator, shifting said end portions toward and away from one another to correspondingly swing the main portions about said axis into and out of the hoop-defining position thereof.

2. A fruit-catching apparatus comprising: a pair of hoop parts respectively formed with opposed semi-circular main portions; means hingedly connecting said main portions at one end thereof for swinging of the main portions toward one another to define a circular hoop, said hoop parts respectively having end portions rigid with and extending outwardly from said ends of the main portions at opposite sides of the hinge means; a center ring concentric with and surrounded by the hoop, the center ring being split to define ends thereon; spokes extending between the ends of the center ring and the other ends of the main portions; a pliable cover extending between and connected to said main portions and ring; an arm supporting said hoop parts and hinge means; and means on the arm connected to said end portions in spaced relation to the axis of the hinge means for, under the control of an operator, shifting said end portions toward and away from one another to correspondingly swing the main portions about said axis into and out of the hoop-defining position thereof, comprising a shaft longitudinally shiftable toward and away from the hinge means between the end portions, and a toggle connected at its ends to and extending between said end portions, said shaft being connected at one end to the toggle between the ends of the toggle and said toggle being formed as a motion-translating linkage operative between the shaft and end portions for converting longitudinal movement of the shaft into said movement of the end portions toward and away from each other.

3. A fruit-catching apparatus comprising: a pair of hoop parts respectively formed with opposed semi-circular main portions; means hingedly connecting said main portions at one end thereof for swinging of the main portions toward one another to define a circular hoop, said hoop parts respectively having end portions rigid with and extending outwardly from said ends of the main portions at opposite sides of the hinge means; a center ring concentric with and surrounded by the hoop, the center ring being split to define ends thereon: spokes extending between the ends of the center ring and the other ends of the main portions; a pliable cover extending between and connected to said main portions and ring; an arm supporting said hoop parts and hinge means; and means on the arm connected to said end portions in spaced relation to the axis of the hinge means for, under the control of an operator, shifting said end portions toward and away from one another to correspondingly swing the main portions about said axis into and out of the hoop-defining position thereof, comprising a shaft longitudinally shiftable toward and away from the hinge means between the end portions, and a toggle connected at its ends to and extending between said end portions, said shaft being connected at one end to the toggle between the ends of the toggle and said toggle being formed as a motion-translating linkage operative between the shaft and end portions for converting longitudinal movement of the shaft into said movement of the end portions toward and away from each other, a crank is threadedly mounted in the other end of said shaft for rotating same, said one end of the shaft having a swivelled connection to the toggle.

4. A fruit-catching apparatus comprising: a pair of hoop parts respectively formed with opposed semi-circular main portions; means hingedly connecting said main portions at one end thereof for swinging of the main portions toward one another to define a circular hoop, said hoop parts respectively having end portions rigid with and extending outwardly from said ends of the main portions at opposite sides of the hinge means; a center ring concentric with and surrounded by the hoop, the center ring being split to define ends thereon; spokes extending between the ends of the center ring and the other ends of the main portions; a pliable cover extending between and connected to said main portions and ring; an arm supporting said hoop parts and hinge means; and means on the arm connected to said end portions in spaced relation to the axis of the hinge means for, under the control of an operator, shifting said end portions toward and away from one another to correspondingly swing the main portions about said axis into and out of the hoop-defining position thereof, comprising a shaft longitudinally shiftable toward and away from the hinge means between the end portions, and a toggle connected at its ends to and extending between said end portions, said shaft being connected at one end to the toggle between the ends of the toggle and said toggle being formed as a motion-translating linkage operative between the shaft and end portions for converting longitudinal movement of the shaft into said movement of the end portions toward and away from each other, a crank is threadedly mounted in the other end of said shaft for rotating same, said one end of the shaft having a swivelled connection to the toggle, said hinge means including a pin secured to the arm beyond said one end of the shaft in line with the shaft, and a hinge mounted between its ends on the pin and fixed at its ends to the respective hoop parts.

5. A fruit-catching apparatus comprising: a pair of hoop parts respectively formed with opposed semi-circular main portions; means hingedly connecting said main portions at one end thereof for swinging of the main portions toward one another to define a circular hoop, said hoop parts respectively having end portions rigid with and extending outwardly from said ends of the main portions at opposite sides of the hinge means; a center ring concentric with and surrounded by the hoop, the center ring being split to define ends thereon; spokes extending between the ends of the center ring and the other ends of the main portions; a pliable cover extending between and connected to said main portions and ring; an arm supporting said hoop parts and hinge means; means on the arm connected to said end portions in spaced relation to the axis of the hinge means for, under the control of an operator, shifting said end portions toward and away from one another to correspondingly swing the main portions about said axis into and out of the hoop-defining position thereof; a vertical post; a link pivotally connected at one end to the post and swinging in a horizontal plane about the post, said arm being pivotally connected to the link and swinging in a horizontal plane about the axis of its connection to the link; and means for locking the link against movement relative to the post in selected positions to which the link is swung.

6. A fruit-catching apparatus comprising: a pair of hoop parts respectively formed with opposed semi-circular main portions; means hingedly connecting said main portions at one end thereof for swinging of the main portions toward one another to define a circular hoop, said hoop parts respectively having end portions rigid with and extending outwardly from said ends of the main portions at opposite sides of the hinge means; a center ring concentric with and surrounded by the hoop, the center ring being split to define ends thereon; spokes extending between the ends of the center ring and the other ends of the main portions; a pliable cover extending between and connected to said main portions and ring; an arm supporting said hoop parts and hinge means; means on the arm connected to said end portions in spaced relation to the axis of the hinge means for, under the control of an operator, shifting said end portions toward and away from one another to correspondingly swing the main portions about said axis into and out of the hoop-defining position thereof; and an elongated tubular duct extending laterally outwardly from said cover, said duct having an inner end opening through the cover, and being inclined slightly from the horizontal downwardly toward its outer end.

References Cited in the file of this patent

UNITED STATES PATENTS

| Number | Name | Date |
|---|---|---|
| 113,855 | Claxton | Apr. 18, 1871 |
| 124,743 | Hinds | Mar. 19, 1872 |
| 478,903 | Ball | July 12, 1892 |
| 959,332 | Fountain | May 24, 1910 |
| 1,473,081 | Cook | Nov. 6, 1923 |
| 1,626,068 | Bartlett | Apr. 26, 1927 |
| 2,436,173 | Knapp | Feb. 17, 1948 |